July 22, 1947.　　　　R. C. WEIKEL　　　　2,424,376
ADJUSTABLE LENGTH DEVICE
Filed April 21, 1945
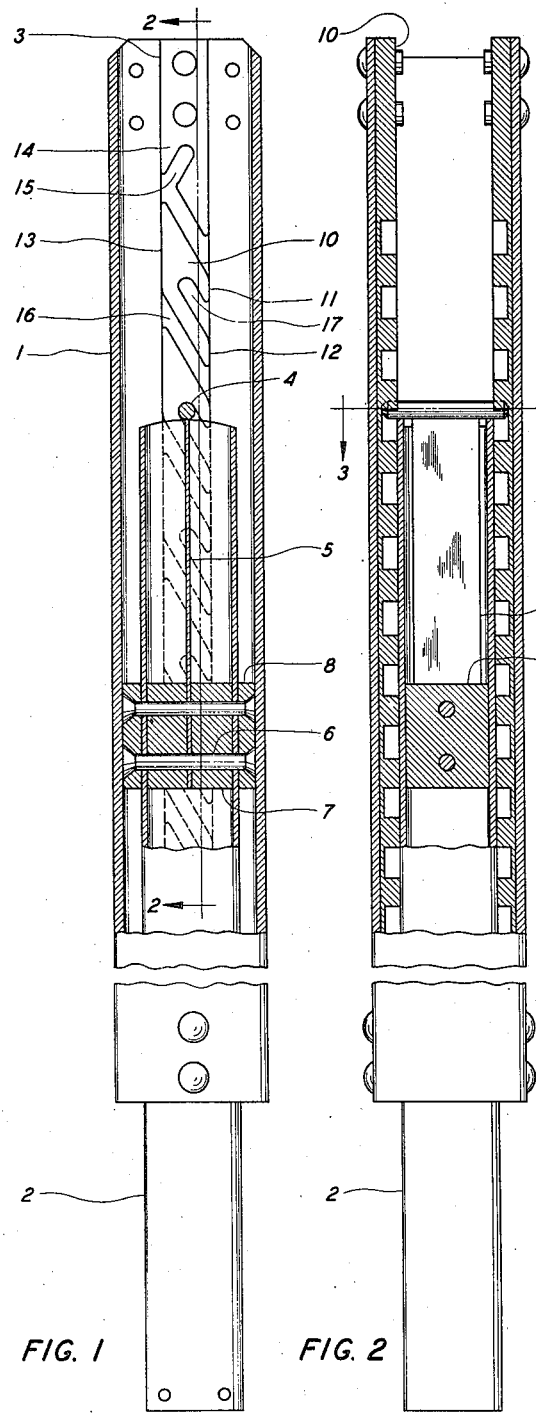
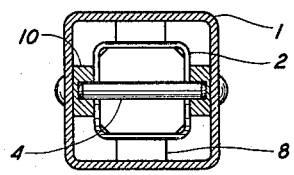
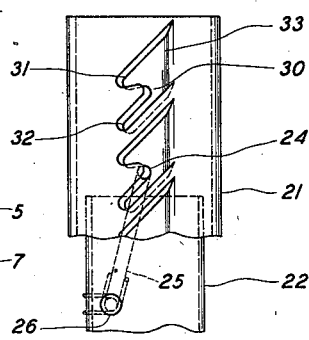
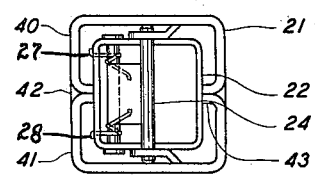
FIG. 1　　FIG. 2　　FIG. 3　　FIG. 4　　FIG. 5
INVENTOR.
RAYMOND C. WEIKEL
BY
　　　AGENT.
Glenn Orlob Patented July 22, 1947

2,424,376

UNITED STATES PATENT OFFICE 2,424,376

ADJUSTABLE LENGTH DEVICE

Raymond C. Weikel, Seattle, Wash., assignor to Boeing Aircraft Company, Seattle, Wash., a corporation of Washington Application April 21, 1945, Serial No. 589,553

3 Claims. (Cl. 248—161)

My invention relates to adjustable length devices such as struts used for adjustable table or tripod legs, props, and other allied uses, or such as tension carrying members used to support suspended lamps or the like.

The chief object of this invention is to provide an elongated structural member adjustable in length by simple manipulation not involving the operation of catches, latches or detents, and yet which will be positively latched against inadvertent collapse.

A further object is to provide an adjustable member of neat and "clean" appearance, free of objectionable protuberances such as latches or pins.

The drawings illustrate the invention as applied to a strut, that is, a member primarily intended and adapted to carry compressive load. However, by reversing certain parts, as will be subsequently explained, the device may be adapted to carry tension loads, and such a tension member is within the scope of my invention.

Figure 1 is an elevational view of one form of a telescopic strut, partly in section;

Figure 2 is an elevational view of the same strut with parts in section as indicated by line 2—2 on Figure 1.

Figure 3 is a transverse sectional view taken on line 3—3 of Figure 2.

Figure 4 is a fragmentary elevational view of a second form of strut, and

Figure 5 is a plan view of the parts shown in Figure 4.

Referring now to Figures 1 and 2, it will be seen that the strut comprises two main elements, tubes 1 and 2, which may be square, the smaller being telescoped within the larger, together with latching mechanism to retain the tubes at any adjusted overall length. This latching mechanism comprises abutments 10 on the interior of the larger tube 1, and a detent comprising a cooperating latch pin 4 carried by the smaller tube 2. This latch pin 4 is arranged athwart the inner end of the smaller tube, and is secured onto the extremity of a leaf spring 5, which extends centrally of the smaller tube 2 and is secured thereto at its lower end by rivets 6 passing through spacers 7 and 8. The leaf spring 5 tends to retain the pin in a neutral, central position athwart the end of the smaller tube 2, as shown in Figure 1, but will allow movement of the pin laterally, under the camming action of the abutments, as will be described below.

The abutments 10 are each of substantially C-shape, having upper and lower arms 11 and 12, and a back 13, the arms extending downwardly and laterally from the back, defining a notch 17 therebetween. If desired, several such notches may be formed on each abutment.

In the form shown, a series of abutments 10 are formed integrally with an elongated abutment strip 3, and an inclined passage or groove 16 is defined between each abutment and the next. Preferably, two such abutment strips 3 are utilized, secured as by rivets to opposed interior faces of the larger tube. Preferably also, these strips 3 are of a thickness to provide guiding surfaces for the smaller tube, which is further guided by the spacers 8 previously mentioned, and means, not shown, adjacent the lower end of the larger tube.

In the position shown in Figures 1 and 2, the ends of the cross pin 4 are engaged in the notches 17 between the arms of one opposed pair of abutments, and the strut is latched against collapse. It will be noted that in this position the pin rests against the extremity of the smaller tube 2, so that the spring 5 is not required to carry the compressive load applied to the strut.

To effect extension of the strut, the smaller tube is moved axially outwardly with respect to the larger, upon which movement the pin is cammed to the right in Figure 1 by the upper face of inclined arm 12, then rides across the open ends of the C-shaped abutments. When the pin is adjacent the notch 17 of any of the abutments, a slight collapsing motion of the tubes will cause entry of the pin into the notch under the influence of spring 5, thus again latching the strut.

To collapse the strut, a slight outward motion of the smaller tube 2 is first effected, to bring pin 4 adjacent a passage 16 between two abutments into which the pin will enter under the influence of spring 5. Collapsing motion of the tubes then will cam the pin to the left in Figure 1, through such passage 16, and upon further motion, the pin will ride over the backs 13 of the abutments. To limit the collapse of the strut, a terminal abutment 14 is provided, having a slot 15 inclined upwardly and to the right in Figure 1, into which the pin 4 is received. If it is desired to latch the strut at some intermediate position, a slight outward motion of tube 2 will cause the pin to ride downwardly through a passage 16 and into a position at the mouth of one of the notches 17. Slight collapsing motion of the strut will then latch the strut, as previously described.

In Figures 4 and 5 is shown one modified form of the strut. In this embodiment, the larger tube 21 is formed of two channel parts, 40 and 41, secured together by welding at 42, each having inturned flanges 43 which form guide surfaces for the inner tube 22. The abutments 30 in this case are formed by cut-out portions of the wall of tube 21, bent inwardly; each abutment has upper and lower arms 31 and 32, and back portion 33, corresponding to portions 11, 12 and 13, respectively, of the device shown in Figure 1.

The cross-pin 24 is carried on an arm 25 pivoted on a second pin 26 passing through the walls of the smaller tube 22. Springs 27 and 28 tend to hold the pin 24 in the neutral central position shown in Figure 4. The operation of this form of the strut is identical with that of the form of Figure 1, already described.

The device in the form of a strut is particularly useful as a leg for a table or tripod, as a standard for a stand or lamp, or as a brace or prop, such as is used to hold open luggage compartment doors on automobiles. Obviously, it finds application wherever a column member of adjustable length is required or desired. The absence of external catches or exposed mechanism is especially desirable in situations where simplicity of manipulation and clean appearance are factors.

Obviously, by reversing the inclination of the abutments in either of the devices described, a member suitable for tensile rather than compressive loads will result. Such a member will have utility for suspending lamp fixtures, and for analogous purposes.

I claim as my invention:

1. An adjustable member comprising a first element, a second element linearly slidable with respect to the first, a detent carried on the first element, yieldable means tending to maintain the detent in a neutral position, and an abutment carried on the second element comprising two generally parallel faces inclined to the direction of sliding of the elements and engageable by the detent upon such sliding to deflect the detent from its neutral position, and a locking recess between said faces, adapted to receive the detent.

2. An adjustable device comprising a tube, a member telescopically received within the tube and slidable therein, a leaf spring carried by the member, a cross pin mounted on the spring for lateral movement therewith, and an elongated abutment strip secured to the tube and provided with a series of grooves disposed at an angle to the axis of the tube, certain of said grooves extending entirely across said strip, and others partially thereacross, whereby the pin may be engaged in a partial groove to prevent relative movement of the tube and member in one direction, or engaged in an entire groove to provide for relative motion in either direction.

3. An adjustable length device comprising a first element, a second element guided for linear sliding with respect to the first, a latch mounted on the second element for motion generally perpendicular to the direction of sliding, means tending to maintain the latch in a neutral position, an abutment secured to said first element, and engageable by the latch, said abutment being of generally parallelogram form, having two faces generally parallel to the direction of sliding and the other two faces forming acute angles with such direction, said abutment further having a notch on one of the first-mentioned faces adapted to receive the latch, the sides of the notch being inclined to said face in the same direction as are the second-mentioned faces, whereby upon motion of the first and second elements in one direction the latch will move freely across the notch, while upon motion in the reverse direction, the latch will engage in said notch, or pass along one of the second-mentioned faces, depending upon the initial position of said latch with respect to said abutment.

RAYMOND C. WEIKEL.

REFERENCES CITED

The following references are of record in the file of this patent:

UNITED STATES PATENTS

| Number | Name | Date |
| --- | --- | --- |
| 81,310 | Tilton et al. | Aug. 18, 1868 |
| 298,257 | Vail | May 6, 1884 |
| 390,406 | Sittig | Oct. 2, 1888 |
| 576,279 | Schleese | Feb. 2, 1897 |
| 1,951,754 | Gilbert | Mar. 20, 1934 |
| 2,171,653 | Heitmann | Sept. 5, 1939 |